(12) United States Patent
Wang et al.

(10) Patent No.: US 8,662,731 B2
(45) Date of Patent: Mar. 4, 2014

(54) FOLDABLE BACKLIT DISPLAY AND DEVICE HAVING THE SAME

(75) Inventors: Yi-Kai Wang, New Taipei (TW);
Tsung-Hua Yang, New Taipei (TW);
Tarng-Shiang Hu, New Taipei (TW);
Chih-Hao Chang, New Taipei (TW);
Yu-Jung Peng, New Taipei (TW)

(73) Assignee: Wistron Corporation, New Taipei (TW)

( * ) Notice: Subject to any disclaimer, the term of this patent is extended or adjusted under 35 U.S.C. 154(b) by 235 days.

(21) Appl. No.: 13/334,947

(22) Filed: Dec. 22, 2011

(65) Prior Publication Data
US 2012/0243206 A1   Sep. 27, 2012

(30) Foreign Application Priority Data
Mar. 21, 2011   (TW) .............................. 100109531 A

(51) Int. Cl.
*F21V 7/18* (2006.01)
(52) U.S. Cl.
USPC ......... 362/632; 362/616; 362/97.1; 362/97.2; 362/97.4; 40/541; 349/61
(58) Field of Classification Search
USPC .......... 362/616, 632, 97.1–97.4; 40/541–583; 349/61–67
See application file for complete search history.

(56) References Cited

U.S. PATENT DOCUMENTS

| | | | |
|---|---|---|---|
| 5,523,930 A * | 6/1996 | Fritts ............................. | 362/223 |
| 6,016,176 A * | 1/2000 | Kim et al. ...................... | 349/84 |
| 6,483,482 B1 * | 11/2002 | Kim ................................ | 345/3.1 |
| 7,433,179 B2 * | 10/2008 | Hisano et al. ............ | 361/679.27 |
| 7,548,415 B2 | 6/2009 | Kim | |
| 7,570,483 B2 * | 8/2009 | Kim .......................... | 361/679.26 |
| 7,714,801 B2 * | 5/2010 | Kimmel ........................ | 345/1.3 |
| 8,151,501 B2 * | 4/2012 | Bemelmans et al. ........... | 40/610 |
| 8,228,667 B2 * | 7/2012 | Ma ............................ | 361/679.01 |
| 8,385,055 B2 * | 2/2013 | Kao et al. .................. | 361/679.06 |
| 8,508,920 B2 | 8/2013 | Huitema et al. | |
| 2007/0044357 A1 * | 3/2007 | Biondo et al. .................. | 40/544 |

FOREIGN PATENT DOCUMENTS

| | | |
|---|---|---|
| CN | 1961276 | 5/2007 |
| CN | 101952788 | 1/2011 |

OTHER PUBLICATIONS

Office Action for Chinese Application No. 201110067365.2 dated Sep. 30, 2013.

* cited by examiner

*Primary Examiner* — Ismael Negron
(74) *Attorney, Agent, or Firm* — Steptoe & Johnson LLP

(57) ABSTRACT

A display includes an outer casing, two backlight modules, and a flexible display panel. The outer casing includes at least one connecting member having two connecting ends respectively disposed at left and right sides thereof, and two casing panels connected respectively to the connecting ends and respectively having bonding faces. The two backlight modules are disposed respectively on the bonding faces of the casing panels. The flexible display panel includes two side panel sections disposed respectively on the backlight modules, and a foldable intermediate section connected between the side panel sections. The casing panels are pivotal relative to each other to move the backlight modules and the flexible display panel to an unfolded position. The backlight modules coplanarly cover a backside of the flexible display panel in the unfolded position.

20 Claims, 13 Drawing Sheets

FOLDABLE BACKLIT DISPLAY AND DEVICE HAVING THE SAME

CROSS-REFERENCE TO RELATED APPLICATION

This application claims priority of Taiwanese Patent Application No. 100109531, filed on Mar. 21, 2011, the disclosure of which is incorporated herein by reference.

BACKGROUND OF THE INVENTION

1. Field of the Invention

This invention relates to a display, and more particularly to a display that is movable between folded and unfolded positions and an electronic device having the same.

2. Description of the Related Art

Currently, through the design of a flexible display panel in a portable electronic device, a housing of the electronic device can simultaneously move the flexible display panel between folded and unfolded positions. However, how to conceptualize a structural design such that a backlight module can provide uniform light to the flexible display panel when the flexible display panel is in the unfolded position becomes the subject of improvement of the present invention.

SUMMARY OF THE INVENTION

Therefore, an object of the present invention is to provide a display and an electronic device having the same. When the display is in an unfolded position, a backlight module can provide uniform light to a flexible display panel, so that the flexible display panel can display uniform brightness or luminosity.

The purpose of the present invention and the solution to the conventional technical problems are achieved through employment of the below technical means. According to one aspect of disclosure of the present invention, a display comprises an outer casing, two backlight modules, and a flexible display panel.

The outer casing includes at least one connecting member and two casing panels. The connecting member has two connecting ends respectively disposed at left and right sides thereof. The casing panels are connected respectively to the connecting ends, and respectively have bonding faces. The two backlight modules are disposed respectively on the bonding faces of the casing panels. The flexible display panel includes two side panel sections disposed respectively on the backlight modules, and a foldable intermediate section connected between the side panel sections. The casing panels are pivotal relative to each other to move the backlight modules and the flexible display panel to an unfolded position. The backlight modules coplanarly cover a backside of the flexible display panel in the unfolded position.

According to another aspect of this invention, an electronic device comprises a display and an electronic control unit. The display includes an outer casing, two backlight modules, and a flexible display panel.

The outer casing includes at least one connecting member and two casing panels. The connecting member has two connecting ends respectively disposed at left and right sides thereof. The casing panels are connected respectively to the connecting ends, and respectively have bonding faces. The two backlight modules are disposed respectively on the bonding faces of the casing panels. The flexible display panel includes two side panel sections disposed respectively on the backlight modules, and a foldable intermediate section connected between the side panel sections. The casing panels are pivotal relative to each other to move the backlight modules and the flexible display panel to an unfolded position. The backlight modules coplanarly cover a backside of the flexible display panel in the unfolded position. The electronic control unit includes a coupling frame connected to one end of one of the casing panels, which is opposite to the connecting member, a control module disposed on the coupling frame, and a soft circuit board connected electrically to the control module, the backlight modules, and the flexible display panel.

The coupling frame includes a carrier plate carrying the control module, and a coupling member connected pivotally to the carrier plate and one of the casing panels. In the folded position, the control module and the carrier plate are disposed between the side panel sections of the flexible display panel.

Through the aforesaid technical means, the advantage and efficiency of the electronic device having the display of the present invention reside in that through the connection of the connecting member between the casing panels, when the two casing panels are pivoted to the unfolded position, the casing panels can move the backlight modules to coplanarly cover the backside of the flexible display panel. Through this configuration, the backlight modules can provide uniform light to the flexible display panel, which in turn, can display uniform brightness or luminosity.

BRIEF DESCRIPTION OF THE DRAWINGS

Other features and advantages of the present invention will become apparent in the following detailed description of the embodiments of the invention, with reference to the accompanying drawings, in which.

DETAILED DESCRIPTION OF THE PREFERRED EMBODIMENTS

Figure 1:
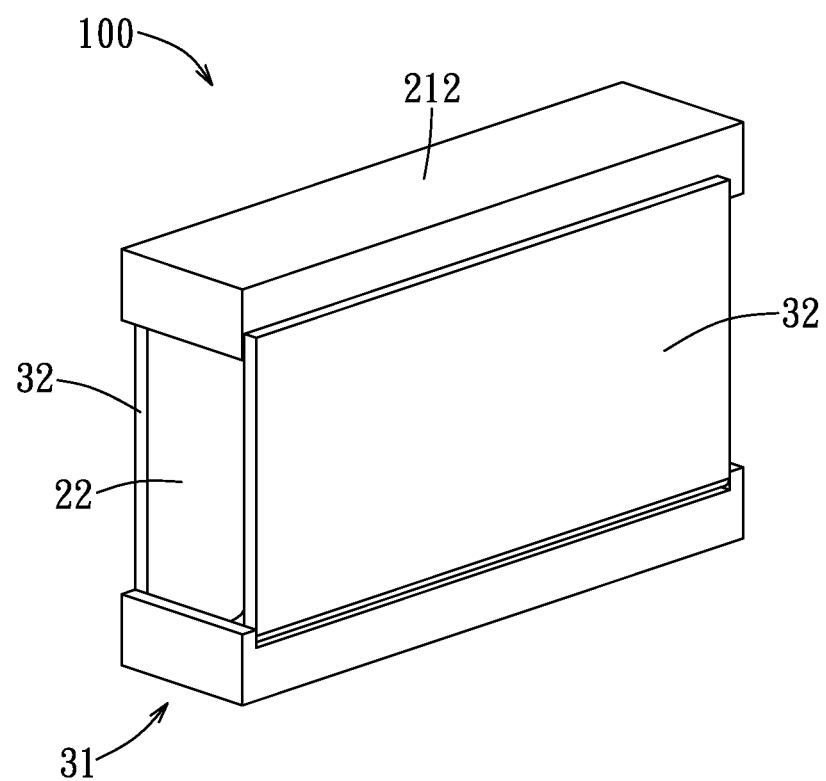
FIG. 1 is a perspective view of an electronic device having a display according to the first embodiment of the present invention in a folded state.

The above-mentioned and other technical contents, features, and effects of this invention will be clearly presented from the following detailed description of two embodiments in coordination with the reference drawings. Through description of the concrete implementation method, the technical means employed and the effectiveness to achieve the predetermined purposes of the present invention will be thoroughly and concretely understood. However, the enclosed drawings are used for reference and description only, and are not used for limiting the present invention.

Before this invention is described in detail, it should be noted that, in the following description, similar elements are designated by the same reference numerals.

Figure 2:
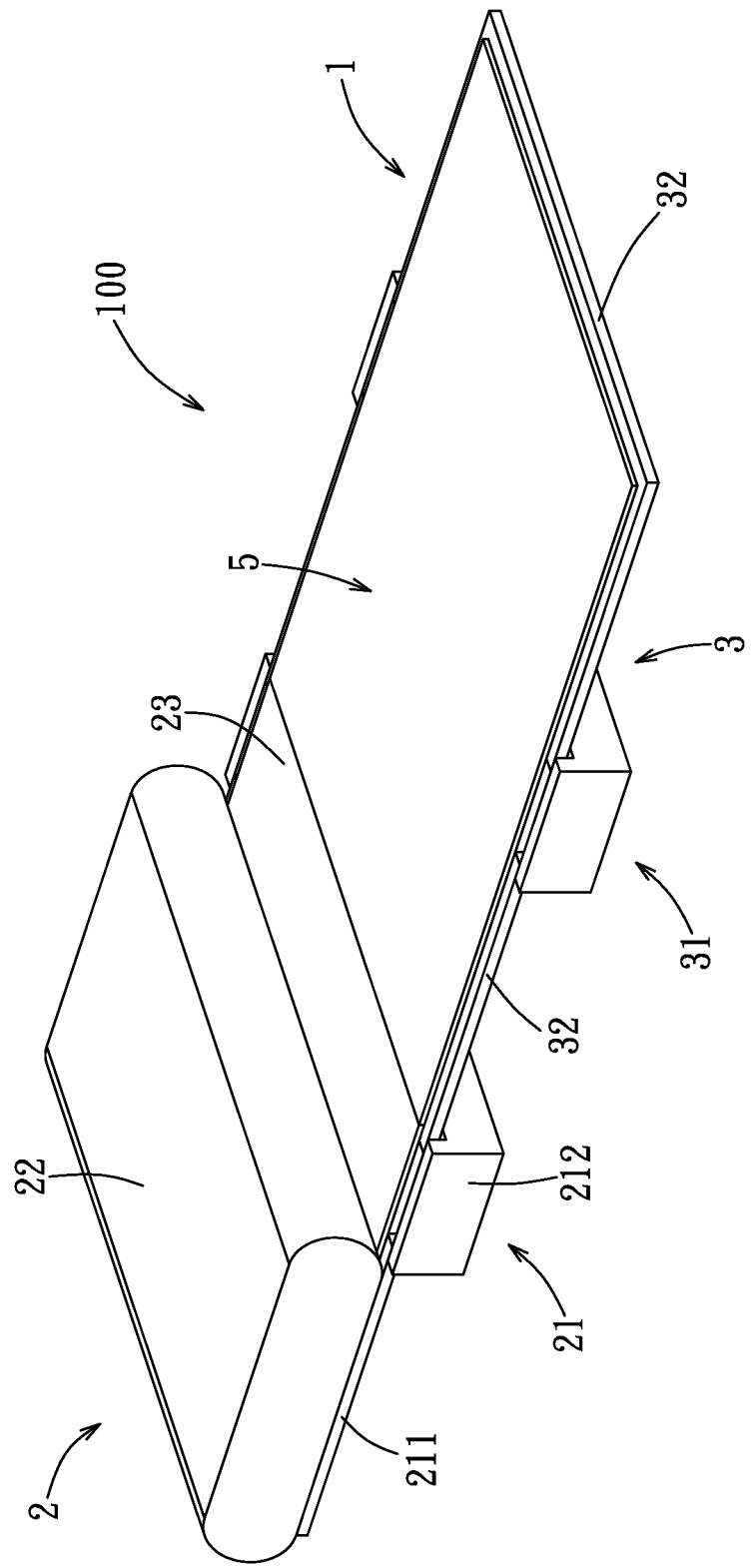
FIG. 2 is a perspective view of the first embodiment in an unfolded state.

Referring to FIGS. 1 and 2, an electronic device 100 according to the first embodiment of the present invention comprises a display 1 and an electronic control unit 2. The electronic device 100 is a portable electronic device, and may be a mobile phone or personal digital assistant (PDA).

Figure 3:
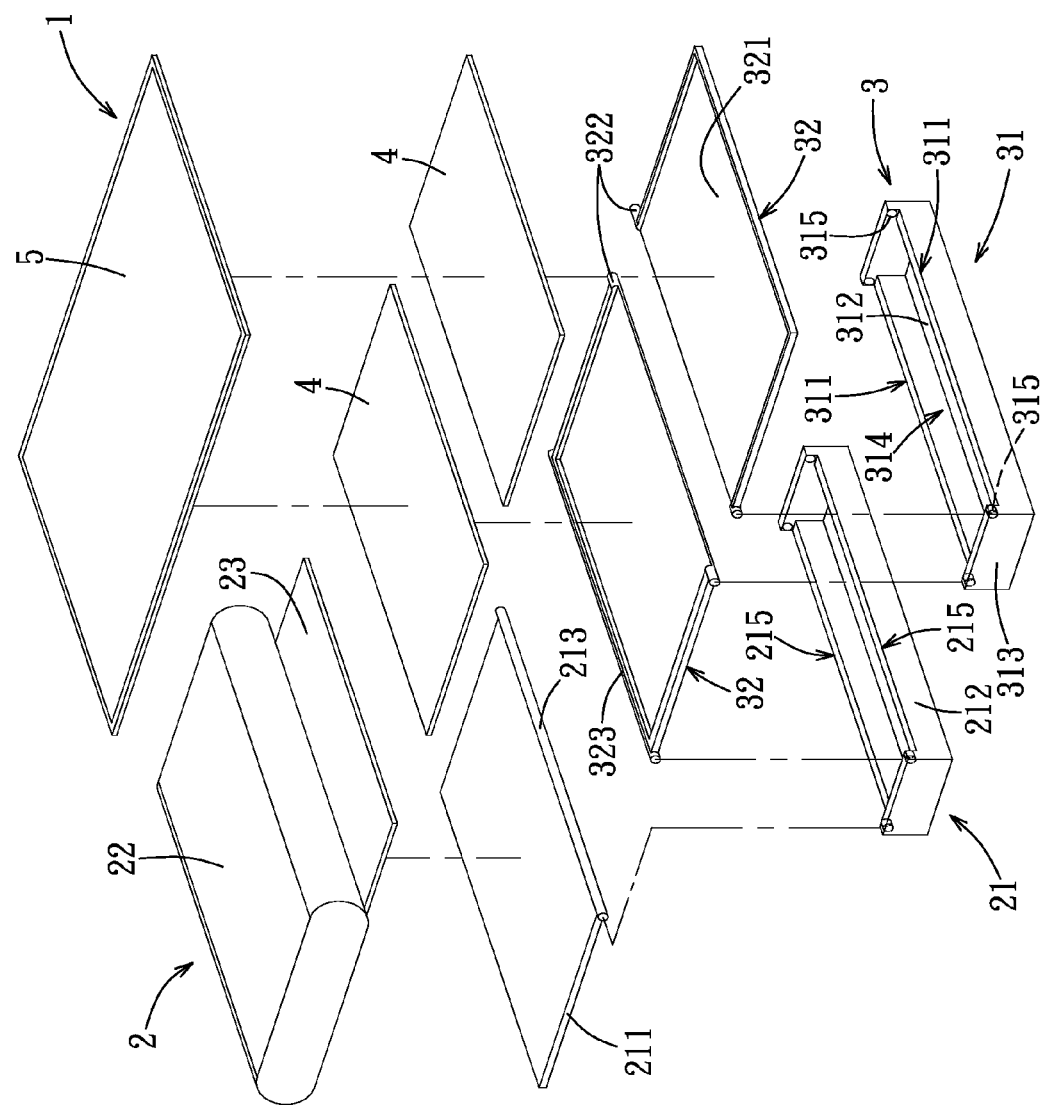
FIG. 3 is an exploded perspective view of the first embodiment.
Figure 4:
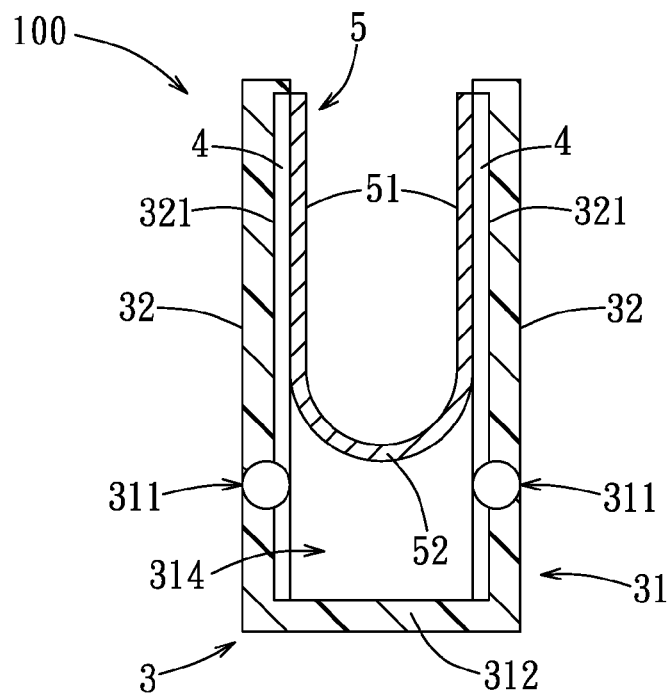
FIG. 4 is a sectional view of the first embodiment, illustrating how a foldable intermediate section of a flexible display panel is folded when two casing panels of an outer casing of the display are in a folded position.
Figure 8:
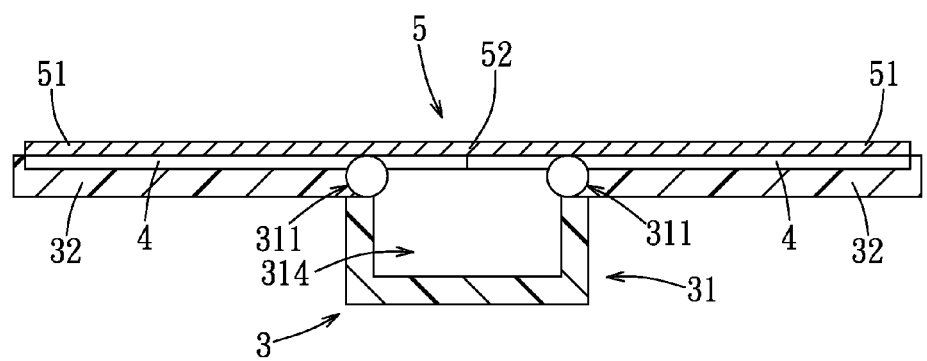
FIG. 8 is a sectional view of the first embodiment, illustrating two backlight modules coplanarly covering a backside of the flexible display panel when the casing panels are in the unfolded position.
Figure 9:
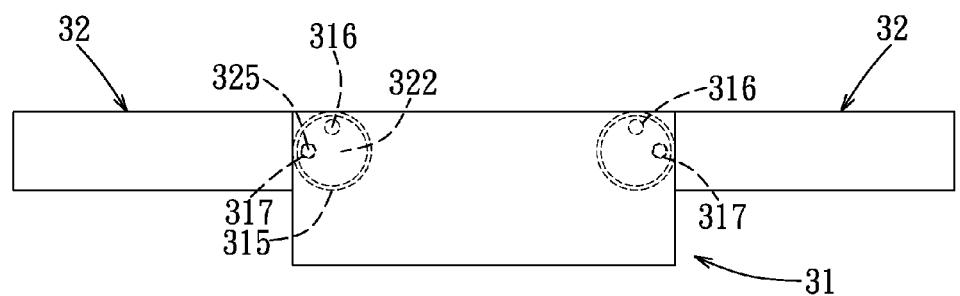
FIG. 9 is a schematic side view of the first embodiment, illustrating the retaining element engaging a second positioning hole in the connecting member of the outer casing when the casing panels are in the unfolded position.
Figure 10:
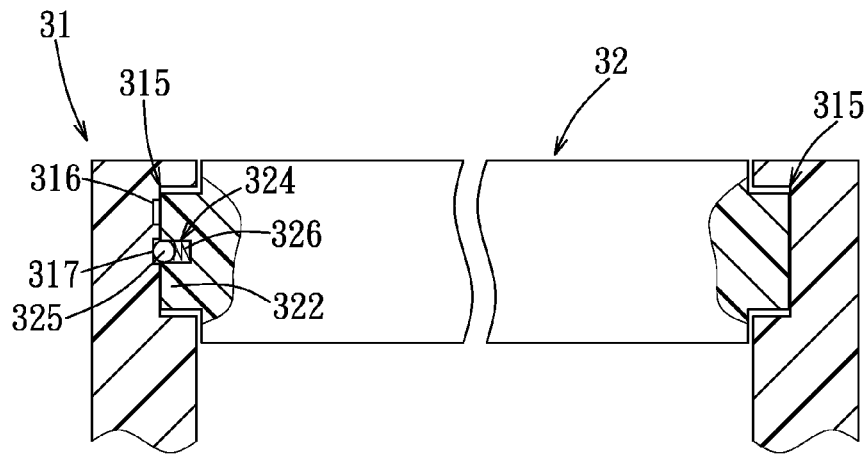
FIG. 10 is a fragmentary sectional view, illustrating how the retaining element engages the second positioning hole when the casing panels are in the unfolded position.

With reference to FIGS. 2 to 4, the display 1 includes an outer casing 3, two backlight modules 4, and a flexible display panel 5. The outer casing 3 includes a connecting member 31 and two casing panels 32. The connecting member 31 has two connecting ends 311 respectively disposed at left and right sides thereof. The casing panels 32 are connected respectively to the connecting ends 311, and respectively have bonding faces 321. The backlight modules 4 are fixed respectively to the bonding faces 321 of the casing panels 32. The flexible display panel 5 includes two side panel sections 51 disposed respectively on the backlight modules 4, and a foldable intermediate section 52 connected between the side panel sections 51. The casing panels 32 are pivotal relative to each other to move the backlight modules 4 and the flexible display panel 5 between a folded position shown in FIG. 4 to an unfolded position shown in FIG. 8. In the unfolded position, the backlight modules 4 coplanarly cover a backside of the flexible display panel 5. Through this configuration, the backlight modules 4 can provide uniform light to the flexible display panel 5 so that the flexible display panel 5 can display uniform brightness or luminosity.

Below is a detailed description of the structure and use of the electronic device 100.

With reference to FIGS. 2 to 4, the connecting member 31 of the outer casing 3, in this embodiment, includes a base wall 312, and a coupling member 313 extending upwardly from an outer periphery of the base wall 312. The base wall 312 and the coupling member 313 cooperatively define a receiving space 314. The two connecting ends 311 of the connecting member 31 are formed on left and right sides of the coupling member 313, respectively. Each connecting end 311 is formed with two pivot holes 315 spaced apart in a front-rear direction. Each casing panel 32 includes a pivot unit 322 pivoted to the pivot holes 315 in one of the connecting ends 311. Through this configuration, each casing panel 32 can rotate relative to the connecting member 31 through the pivot unit 322 so as to move the backlight modules 4 and the flexible display panel 5 between the folded and unfolded positions.

Each of the casing panels 32 has a recess 320 extending in a left-right direction. The bonding face 321 is defined by a recess bottom of the recess 320.

A light-emitting element (not shown) of each backlight module 4 may be a cold cathode tube, a light-emitting diode, or an organic light-emitting diode. Each backlight module 4 provides light required by the flexible display panel 5. In this embodiment, each backlight module 4 is received in the recess 320 of the respective casing panel 32, and is fixed to the bonding face 321 of the respective casing panel 32. The side panel sections 51 of the flexible display panel 5 are fixed to the respective backlight modules 4. It should be noted that each backlight module 4 may be fixed to the bonding face 321 of the respective casing panel 32 by using an adhesive or a snap- or screw-fastening method. Each side panel section 51 of the flexible display panel 5 may also be fixed to the respective backlight module 4 by using an adhesive or a snap- or screw-fastening method. Through the spaced apart left and right configuration of the backlight modules 4, and through the fixing of the side panel sections 51 of the flexible display panel 5 to the respective backlight modules 4, when the casing panels 32 are pivoted to move the backlight modules 4 and the flexible display panel 5 to the folded position, the backlight modules 4 will not be folded, only the foldable intermediate section 52 of the flexible display panel 5 is folded. As such, the user can easily and quickly rotate the display 1 to fold and unfold states.

The electronic control unit 2 includes a coupling frame 21, a control module 22 disposed on the coupling frame 21, and a soft circuit board 23. The coupling frame 21 has a structure similar to that of the connecting member 31, and is connected to one end of one of the casing panels 32, which is opposite to the connecting member 31. The coupling frame 21 includes a carrier plate 211 carrying the control module 22, and a coupling member 212 having two connecting ends 215 respectively disposed at left and right sides thereof. One of the casing panels 32 includes another pivot unit 323 pivoted to one of the connecting ends 215 of the coupling member 212. The carrier plate 211 has a pivot unit 213 pivoted to the other connecting end 215 of the coupling member 212. The soft circuit board 23 is connected electrically to the control module 22, the backlight modules 4, and the flexible display panel 5. Through this configuration, the control module 22 can provide display signal and power to the backlight modules 4 and the flexible display panel 5. The control module 22 is controlled by the user, and through the soft circuit board 23, can transmit control signal to the backlight modules 4 and the flexible display panel 5.

Referring once again to FIGS. 1 to 4, when the casing panels 32 are in the folded position, the foldable intermediate section 52 of the flexible display panel 5 is folded to extend upward the side panel sections 51, the backlight modules 4 are spaced apart in a left-right direction, and the side panel sections 51 are also spaced apart in the left-right direction. Further, portions of the backlight modules 4 project downwardly beyond a bottom end of the foldable intermediate section 52 into the receiving space 314. Moreover, because the coupling frame 21 is connected pivotally to and is disposed between the carrier plate 211 and one of the casing panels 32, the user can turn inwardly both the coupling frame 21 relative to said one of the casing panels 32 and the carrier plate 211 relative to the coupling frame 21 so as to dispose the control module 22 and the carrier plate 211 between the side panel sections 51 of the flexible display panel 5. At this time, the size of the electronic device 100 is reduced to facilitate storage thereof by the user, as best shown in FIG. 1. Additionally, because the casing panels 32 are disposed externally of the flexible display panel 5, the backlight modules 4, and the control module 22, the effect of protecting the flexible display panel 5, the backlight modules 4, and the control module 22 by the casing panels 32 can be achieved.

Figure 5:
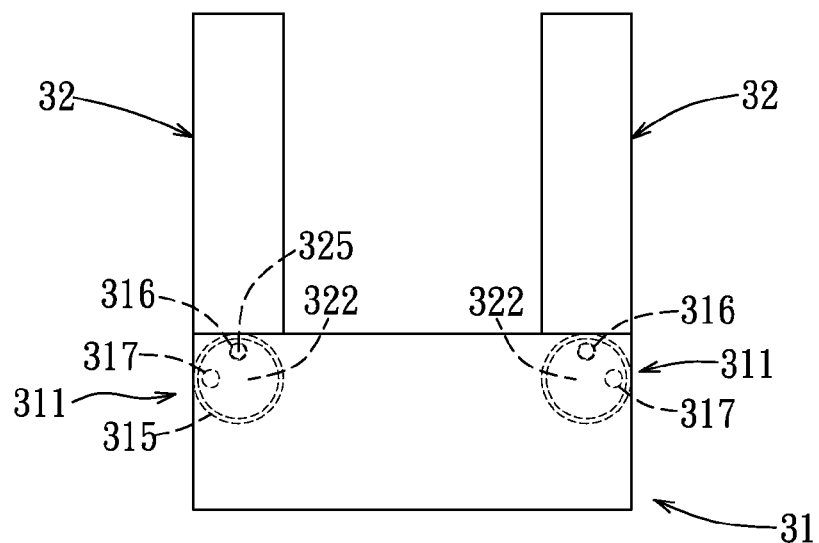
FIG. 5 is a schematic view of the first embodiment, illustrating a retaining element engaging a first positioning hole in a connecting member of the outer casing when the casing panels are in the folded position.
Figure 6:
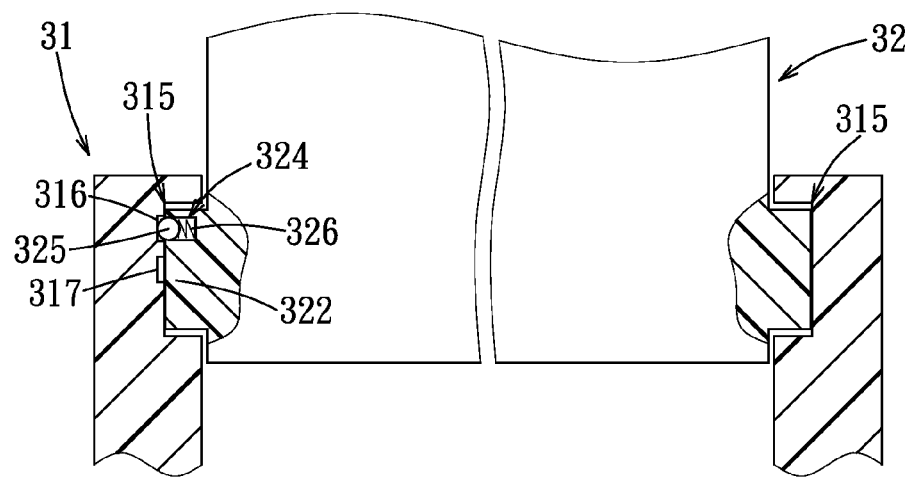
FIG. 6 is a fragmentary sectional view of the first embodiment, illustrating how the retaining element engages the first positioning hole when the casing panels are in the folded position.
Figure 7:
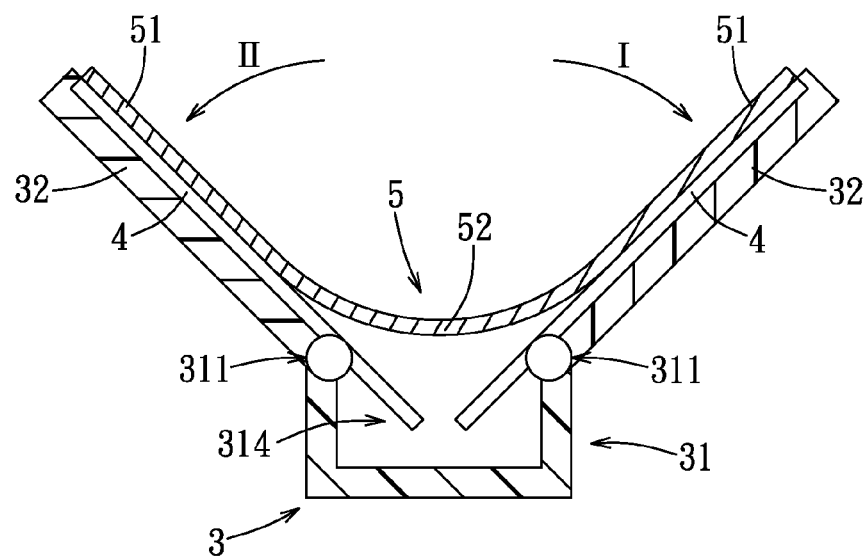
FIG. 7 is a sectional view of the first embodiment, illustrating how the casing panels are moved to an unfolded position.

With reference to FIGS. 5 and 6, on the other hand, each connecting end 311 of the connecting member 31 is further formed with a first positioning hole 316, and a second positioning hole 317 proximate to an outer side of the first positioning hole 316. The first and second positioning holes 316, 317 communicate with one of the pivot holes 315 in one of the connecting ends 311. The pivot unit 322 of each casing panel 32 has one end that is formed with a mounting groove 324 and that has a ball-shaped retaining element 325 disposed in the mounting groove 324, and a biasing spring 326 disposed in the mounting groove 324 to bias the retaining element 325 outwardly. When the casing panels 32 are in the folded position, the mounting groove 324 is aligned with the first positioning hole 316, and the biasing spring 326 biases the ball-shaped retaining element 325 to move out of the mounting groove 324 and engage the first positioning hole 316. Through this configuration, the casing panels 32, the backlight modules 4, and the flexible display panel 5 are retained in the folded position. Further, when the casing panels 32 are retained in the folded position, the side panel sections 51 of the flexible display panel 5 are parallel to each other. Hence, a curvature of the foldable intermediate section 52 of the flexible display panel 5 can be consistently maintained and ensured every time the flexible display panel 5 is folded, thereby reducing the possibility of the foldable intermediate section 52 being damaged or degraded due to frequent change in the curvature.

With reference to FIGS. 7 to 10, to rotate the casing panels 32 from the folded position to the unfolded position, the casing panels 32 are turned in the direction of arrows (I, II), respectively. When the retaining element 325 moves away from the first positioning hole 316 and retracts into the mounting groove 324 to compress the biasing spring 326, the casing panels 32 can move the backlight modules 4 and the side panel sections 51 to rotate until the foldable intermediate section 52 of the flexible display panel 5 gradually moves to a flat state. At this time, the mounting groove 324 of the pivot unit 322 of each casing panel 32 is aligned with the second positioning hole 317, and through a restoring force of the biasing spring 326, the retaining element 325 is biased to move out of the mounting groove 324 and engage the second positioning hole 317. As such, the casing panels 32, the backlight modules 4, and the flexible display panel 5 are retained in the unfolded position. In the unfolded position, the two backlight modules 4 coplanarly cover the backside of the flexible display panel 5. Through this, the two backlight modules 4 can provide uniform light to the flexible display panel 5, which in turn, can display uniform brightness or luminosity.

Further, with reference to FIG. 2, the user can turn outwardly the coupling member 212 and the carrier plate 211, so that the carrier plate 211 and said one of the casing panels 32 are substantially coplanarly connected. Through this, the user can easily control the control module 22 and simultaneously view pictures displayed on the flexible display panel 5. Alternatively, the carrier plate 211 may be inclined so as to form an included angle with said one of the casing panels 32.

Figure 11:
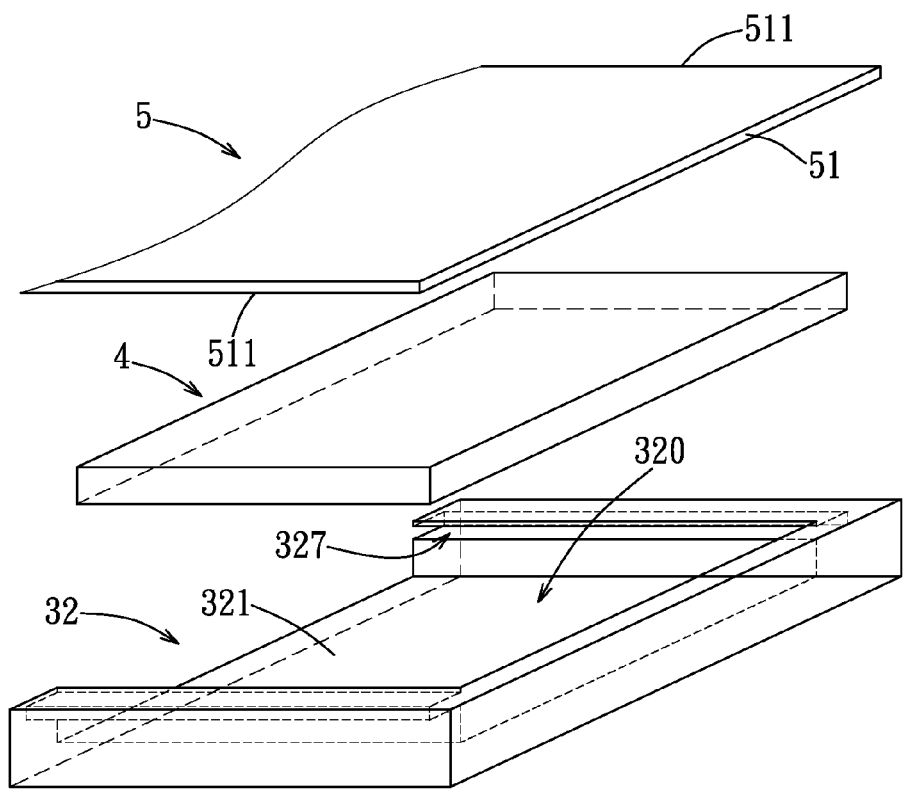
FIG. 11 is an exploded perspective view of an alternative form of the first embodiment, illustrating the casing panel being formed with a recess and a pair of slide grooves.
Figure 12:
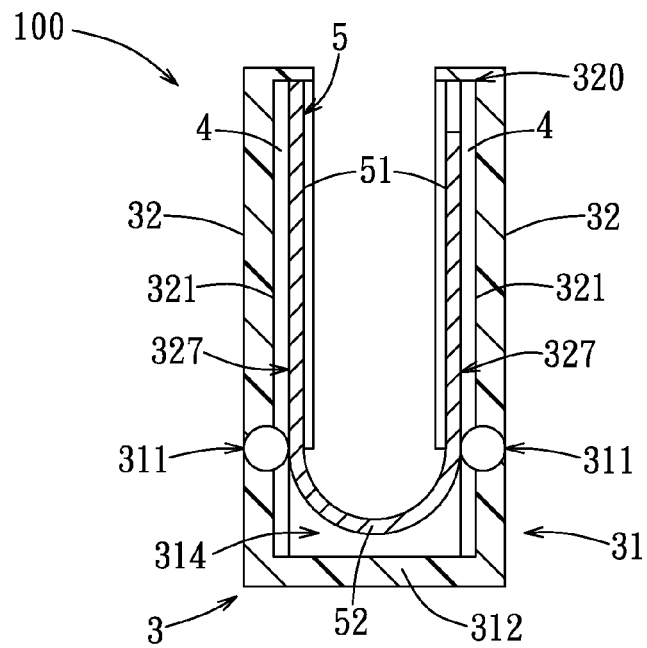
FIG. 12 is a sectional view of the alternative form of the first embodiment, illustrating one of the side panel sections of the flexible display panel being shorter than the other side panel section.
Figure 13:
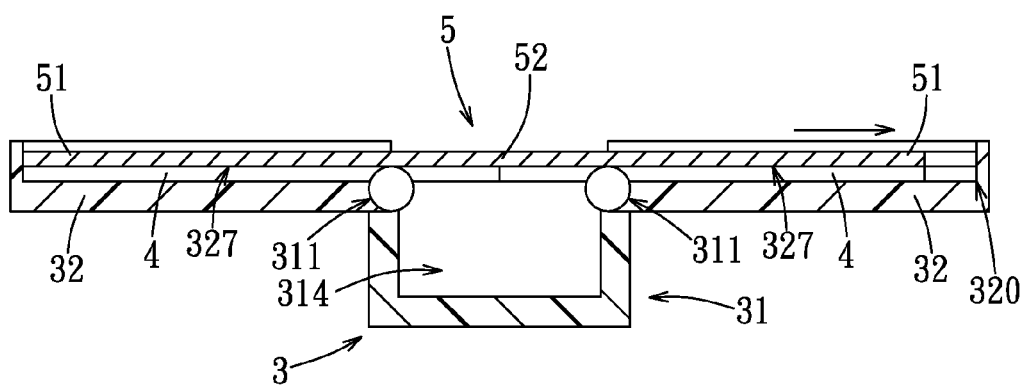
FIG. 13 is a view similar to FIG. 12, but illustrating the casing panels in the unfolded position.

FIGS. 11 to 13 illustrate an alternative form of the first embodiment. When the casing panels 32 of the outer casing 3 are folded, one of the side panel sections 51 of the flexible display panel 5 is shorter than the other side panel section 51. Through the below structural configuration, when the casing panels 32 are rotated to the unfolded position, the two backlight modules 4 can also coplanarly cover the backside of the flexible display panel 5.

One of the casing panels 32 further has a pair of slide grooves 327 (only one is visible in FIG. 11) disposed at two opposite sides of the recess 320 and extending in a left-right direction. A longer one of the side panel sections 51 is fixed to one of the backlight modules 4. A shorter one of the side panel sections 51 is slidable relative to the other one of the backlight modules 4, and has two opposite ends 511 connected slidably and respectively to the slide grooves 327. The short side panel section 51 is slidable in the slide grooves 327 through a guide rail or guide roller. When the casing panels 32 are rotated from the folded position to the unfolded position and the short side panel section 51 is slidable relative to the casing panel 32, the two backlight modules 4 can coplanarly cover the backside of the flexible display panel 5.

Figure 14:
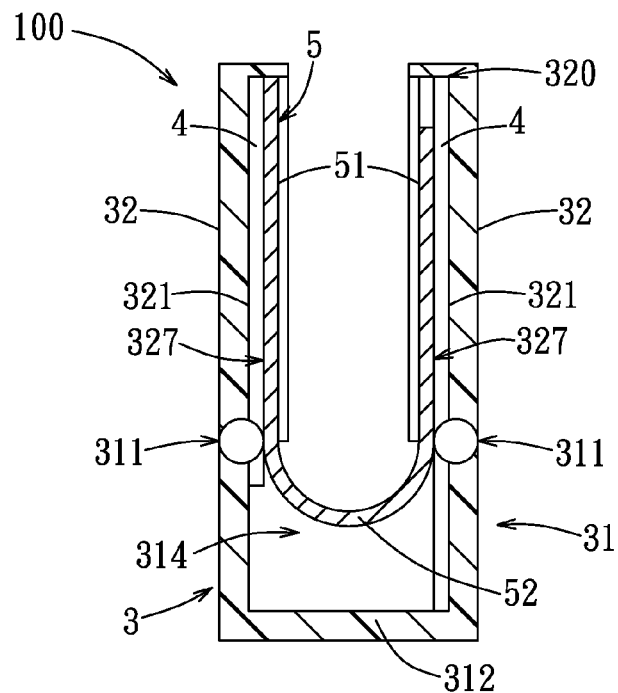
FIG. 14 is a sectional view of another alternative form of the first embodiment, illustrating one of the side panel sections of the flexible display panel being shorter than the other side panel section, and one of the backlight modules being longer than the other backlight module.
Figure 15:
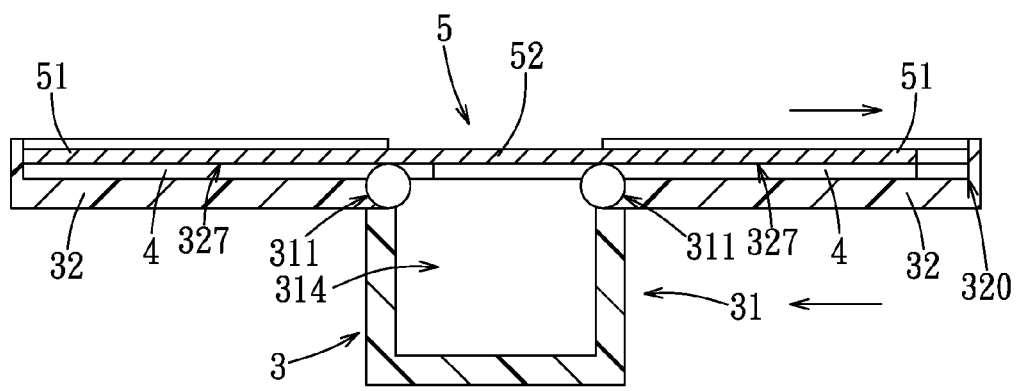
FIG. 15 is a view similar to FIG. 14, but illustrating the casing panels in the unfolded position.
Figure 16:
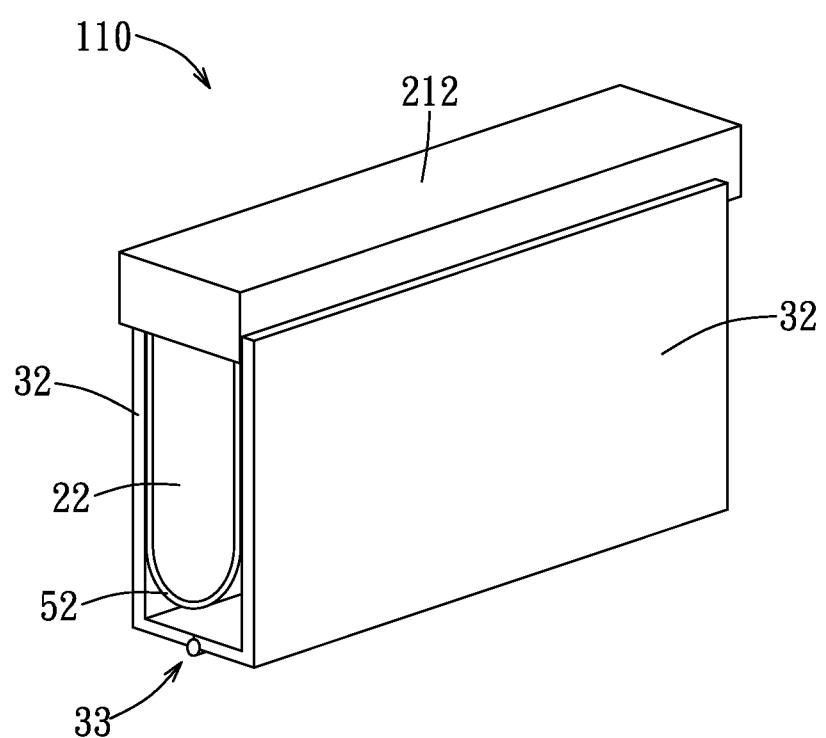
FIG. 16 is a perspective view of an electronic device having a display according to the second embodiment of the present invention in a folded state.

FIGS. 14 and 15, in combination with FIG. 11, illustrate another alternative form of the first embodiment. In addition to one of the side panel sections 51 of the flexible display panel 5 being shorter than the other side panel section 51, one of the backlight modules 4 is longer than the other backlight module 4. Through the below structural configuration, when the casing panels 32 are rotated to the unfolded position, the two backlight modules 4 can also coplanarly cover the backside of the flexible display panel 5.

In this embodiment, a longer one of the backlight modules 4 is connected slidably to the recess 320. The long backlight module 4 is slidable in the recess 320 through a guide rail or guide roller. When the casing panels 32 are rotated from the folded position to the unfolded position and the short side panel section 51 is slidably received in the slide grooves 327, the user can push inwardly the long backlight module 4 relative to the casing panel 32 so as to abut against the short backlight module 4. Through this, the backlight modules 4 can also coplanarly cover the backside of the flexible display panel 5 when the flexible display panel 5 is in the unfolded position.

Referring to FIGS. 16 to 20, an electronic device 110 having the display 1 according to the second embodiment of the present invention has an overall structure and operating method similar to that of the first embodiment. The difference between the first and second embodiments resides in the structural design of the connecting member 33 of the outer casing 3.

Figure 17:
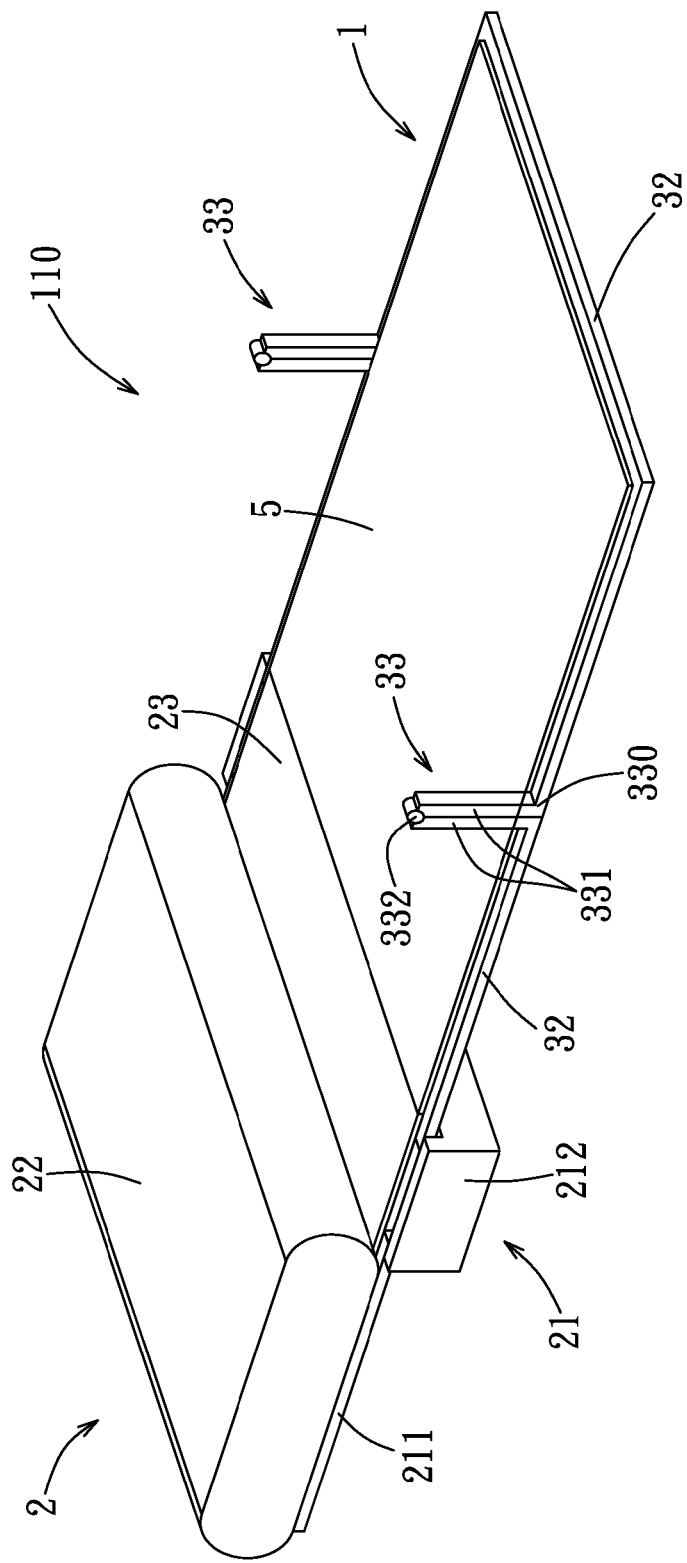
FIG. 17 is a perspective view of the second embodiment in an unfolded state.
Figure 18:
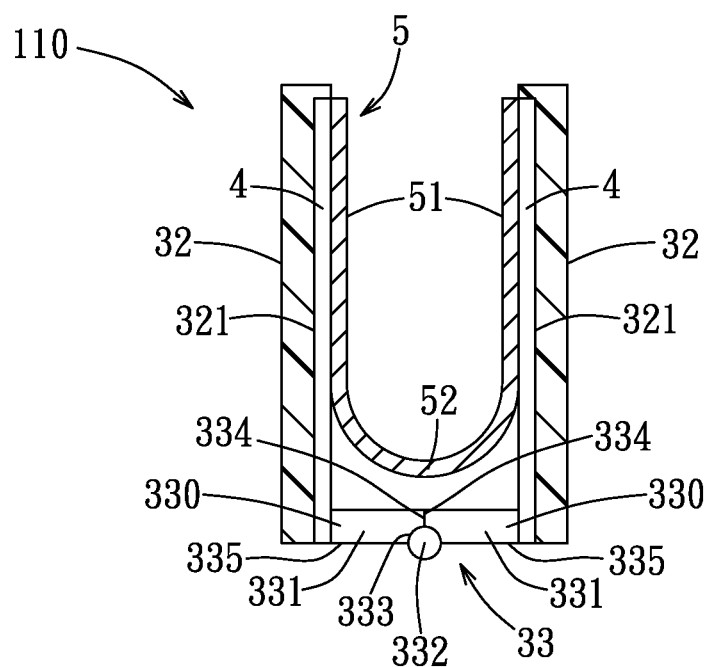
FIG. 18 is a sectional view of the second embodiment, illustrating first stop faces of pivot arms abutting against each other when two casing panels of an outer casing of the display are in a folded position.

With reference to FIGS. 17 and 18, in this embodiment, the outer casing 3 includes two connecting members 33 spaced apart in a front-rear direction. Each connecting member 33 has two connecting ends 330. Each of the casing panels 32 is connected to one of the connecting ends 330 of each of the connecting members 33. Each connecting member 33 includes two pivot arms 331 adjacent to each other in a left-right direction, and a hinge member 332. An outer end of each pivot arm 331 forms one of the connecting ends 330, and an inner end of each pivot arm 331 forms a pivot portion 333. In this embodiment, the connecting end 330 of each pivot arm 331 is formed integrally as one piece with each casing panel 32. Each pivot arm 331 and the corresponding casing panel 32 cooperatively form an L-shaped configuration. The hinge member 332 is connected to the pivot portions 333 of the pivot arms 331. The two casing panels 32 are movable between the folded and unfolded positions through the hinge members 332 of the connecting members 33.

Further, each pivot arm 331 has a first stop face 334 at the inner end thereof and extending transversely relative to a length of the pivot arm 331, and a second stop face 335 transverse to the first stop face 334 and extending from the inner end to the outer end of the pivot arm 331. When the casing panels 32 are folded, the first stop faces 334 of the two pivot arms 331 abut against each other. At this time, the casing panels 32 can no longer rotate toward each other. Through this, the casing panels 32, the backlight modules 4, and the flexible display panel 5 are retained in the folded position, and the flexible display panel 5 is prevented from being excessively folded.

Figure 19:
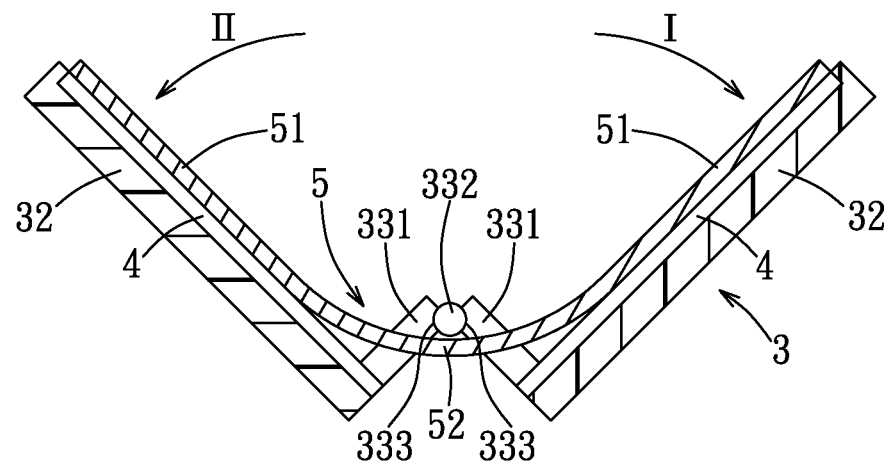
FIG. 19 is a view similar to FIG. 18, but illustrating how the casing panels are moved to an unfolded position.
Figure 20:
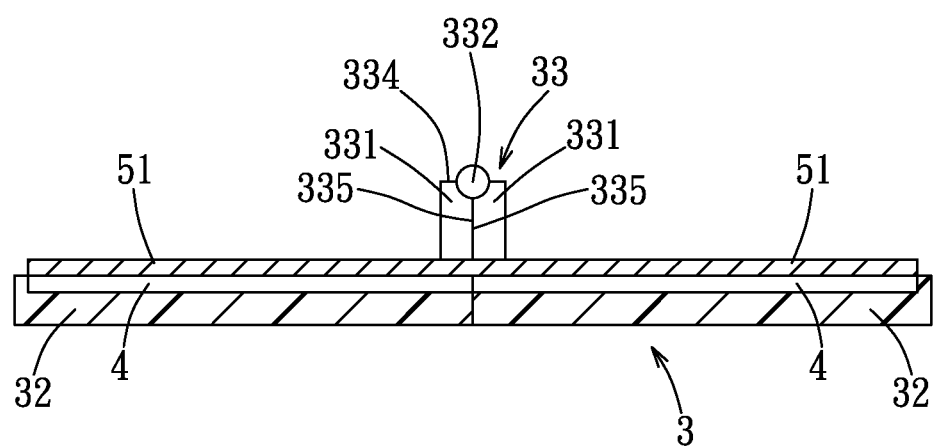
FIG. 20 is a view similar to FIG. 18, but illustrating the casing panels in the unfolded position.

With reference to FIGS. 19 and 20, to rotate the casing panels 32 from the folded position to the unfolded position, the casing panels 32 are rotated in the direction of arrows (I, II), respectively. The casing panels 32 move the backlight modules 4 and the side panel sections 51 of the flexible display panel 5 to rotate until the foldable intermediate section 52 of the flexible display panel 5 is gradually moved to a flat state. When the second stop faces 335 of the pivot arms 331 abut against each other, the casing panels 32 are stopped from continuously rotating. Through this, the casing panels 32, the backlight modules 4, and the flexible display panel 5 are retained in the unfolded position. It should be noted that although the exemplified number of the connecting members 33 is two, it may be one in an alternative embodiment. The effect of rotating the casing panels 32 between the folded and unfolded positions may be similarly achieved. Furthermore, although the connecting end 330 of each pivot arm 331 is formed integrally as one piece with the corresponding casing panel 32 in this embodiment, the connecting end 330 may be connected to the corresponding casing panel 32 through a snap- or screw-fastening method in an alternative embodiment.

From the aforesaid description, through the structural design of the connecting members 31, 33 of the outer casing 3, when the casing panels 32 are rotated to the unfolded position, the two backlight modules 4 are moved by the casing panels 32 to coplanarly cover the backside of the flexible display panel 5. As such, the backlight modules 4 can provide uniform light to the flexible display panel 5, and the flexible display panel 5, in turn, can display uniform brightness or luminosity. Hence, the object of the present invention can be realized.

While the present invention has been described in connection with what are considered the most practical and embodiments, it is understood that this invention is not limited to the disclosed embodiments but is intended to cover various arrangements included within the spirit and scope of the broadest interpretations and equivalent arrangements.

What is claimed is:

1. A display for an electronic device, comprising:
an outer casing including at least one connecting member and two casing panels, said connecting member having two connecting ends respectively disposed at left and right sides thereof, said casing panels being connected respectively to said connecting ends and respectively having bonding faces;
two backlight modules disposed respectively on said bonding faces of said casing panels; and
a flexible display panel including two side panel sections disposed respectively on said backlight modules, and a foldable intermediate section connected between said side panel sections, wherein said casing panels are pivotal relative to each other to move said backlight modules and said flexible display panel to an unfolded position, said backlight modules coplanarly covering a backside of said flexible display panel in said unfolded position.

2. The electronic device as claimed in claim 1, wherein at least one of said casing panels is formed with a recess, and a pair of slide grooves on two opposite sides of said recess, one of said side panel sections being fixed to one of said backlight modules, the other one of said backlight modules being received in said recess, the other one of said side panel sections being slidable relative to the other one of said backlight modules and being connected slidably to said slide grooves.

3. The electronic device as claimed in claim 2, wherein the other one of said backlight modules is connected slidably to said recess.

4. The display as claimed in claim 1, wherein said casing panels are pivotal relative to each other to move said backlight modules and said flexible display panel to a folded position, wherein, when said flexible display panel is folded to extend upward said side panel sections, portions of said backlight modules project downwardly beyond a bottom end of said foldable intermediate section.

5. The display as claimed in claim 4, wherein each of said connecting ends is formed with two pivot holes spaced apart in a front-rear direction, a first positioning hole, and a second positioning hole proximate to an outer side of said first positioning hole, said first and second positioning holes communicating with one of said pivot holes, each of said casing panels including a pivot unit pivoted to said pivot holes in one of said connecting ends, said pivot unit being formed with a mounting groove, and having a retaining element disposed in said mounting groove, and a biasing spring disposed in said mounting groove to bias outwardly said retaining element, said retaining element engaging said first positioning hole in said folded position, and engaging said second positioning hole in said unfolded position.

6. The display as claimed in claim 4, wherein said connecting member includes two pivot arms adjacent to each other in a left-right direction, and a hinge member, and wherein, when said pivot arms lie linearly, an outer end of each of said pivot arms forms one of said connecting ends, and an inner end of each of said pivot arms forms a pivot portion, said hinge member being connected to said pivot portions of said pivot arms.

7. The electronic device as claimed in claim 6, wherein each of said pivot arms has a first stop face at said inner end and extending transversely relative to a length of said pivot arm, and a second stop face transverse to said first stop face and extending from said inner end to said outer end, said first stop faces of said pivot arms abutting against each other in said folded position, said second stop faces of said pivot arms abutting against each other in said unfolded position.

8. The electronic device as claimed in claim 4, wherein said outer casing includes two said connecting members spaced apart in a front-rear direction, each of said connecting members having said two connecting ends, each of said casing panels being connected to one of said connecting ends of each of said connecting members.

9. The electronic device as claimed in claim 8, wherein each of said connecting members includes two pivot arms adjacent to each other in a left-right direction, and a hinge member, wherein, when said pivot arms lie linearly, an outer end of each of said pivot arms forms one of said connecting ends, and an inner end of each of said pivot arms forms a pivot portion, said hinge member being connected to said pivot portions of said pivot arms, wherein each of said pivot arms further has a first stop face at said inner end and extending transversely relative to a length of said pivot arm, and a second stop face transverse to said first stop face and extending from said inner end to said outer end, said first stop faces of said pivot arms abutting against each other in said folded position, said second stop faces of said pivot arms abutting against each other in said unfolded position.

10. An electronic device, comprising:
a display including
an outer casing including at least one connecting member and two casing panels, said connecting member having two connecting ends respectively disposed at left and right sides thereof, said casing panels being connected respectively to said connecting ends and respectively having bonding faces,
two backlight modules disposed respectively on said bonding faces of said casing panels, and
a flexible display panel including two side panel sections disposed respectively on said backlight modules, and a foldable intermediate section connected between said side panel sections, wherein said casing panels are pivotal relative to each other to move said backlight modules and said flexible display panel to an unfolded position, said backlight modules coplanarly covering a backside of said flexible display panel in said unfolded position; and
an electronic control unit including a coupling frame connected to one end of one of said casing panels, which is opposite to said connecting member, a control module disposed on said coupling frame, and a soft circuit board connected electrically to said control module, said backlight modules, and said flexible display panel.

11. The electronic device as claimed in claim 10, wherein at least one of said casing panels is formed with a recess, and a pair of slide grooves on two opposite sides of said recess, one of said side panel sections (13) being fixed to one of said backlight modules, the other one of said backlight modules being received in said recess, the other one of said side panel sections being slidable relative to the other one of said backlight modules and being connected slidably to said slide grooves.

12. The electronic device as claimed in claim 11, wherein the other one of said backlight modules is connected slidably to said recess.

13. The electronic device as claimed in claim 10, wherein said casing panels are pivotal relative to each other to move said backlight modules and said flexible display panel to a folded position, wherein, when said flexible display panel is folded to extend upward said side panel sections, portions of said backlight modules project downwardly beyond a bottom end of said foldable intermediate section.

14. The electronic device as claimed in claim 13, wherein said coupling frame includes a carrier plate carrying said control module, and a coupling member connected pivotally to said carrier plate and said one of said casing panels, and wherein, in said folded position, said control module and said carrier plate are disposed between said side panel sections of said flexible display panel.

15. The electronic device as claimed in claim 13, wherein each of said connecting ends is formed with two pivot holes spaced apart in a front-rear direction, a first positioning hole, and a second positioning hole proximate to an outer side of said first positioning hole, said first and second positioning holes communicating with one of said pivot holes, each of said casing panels including a pivot unit pivoted to said pivot holes in one of said connecting ends, said pivot unit being formed with a mounting groove, and having a retaining element disposed in said mounting groove, and a biasing spring disposed in said mounting groove to bias outwardly said retaining element, said retaining element engaging said first positioning hole in said folded position, and engaging said second positioning hole in said unfolded position.

16. The electronic device as claimed in claim 13, wherein said connecting member includes two pivot arms adjacent to each other in a left-right direction, and a hinge member, and wherein, when said pivot arms lie linearly, an outer end of each of said pivot arms forms one of said connecting ends, and an inner end of each of said pivot arms forms a pivot portion, said hinge member being connected to said pivot portions of said pivot arms.

17. The electronic device as claimed in claim 16, wherein each of said pivot arms has a first stop face at said inner end and extending transversely relative to a length of said pivot arm, and a second stop face transverse to said first stop face and extending from said inner end to said outer end, said first stop faces of said pivot arms abutting against each other in said folded position, said second stop faces of said pivot arms abutting against each other in said unfolded position.

18. The electronic device as claimed in claim 13, wherein said outer casing includes two said connecting members spaced apart in a front-rear direction, each of said connecting members having said two connecting ends, each of said casing panels being connected to one of said connecting ends of each of said connecting members.

19. The electronic device as claimed in claim 18, wherein each of said connecting members includes two pivot arms adjacent to each other in a left-right direction, and a hinge member, and wherein, when said pivot arms lie linearly, an outer end of each of said pivot arms forms one of said connecting ends, and an inner end of each of said pivot arms forms a pivot portion, said hinge member being connected to said pivot portions of said pivot arms.

20. The electronic device as claimed in claim 19, wherein each of said pivot arms further has a first stop face at said inner end and extending transversely relative to a length of said pivot arm, and a second stop face transverse to said first stop face and extending from said inner end to said outer end, said first stop faces of said pivot arms abutting against each other in said folded position, said second stop faces of said pivot arms abutting against each other in said unfolded position.

* * * * *